Figure 1:
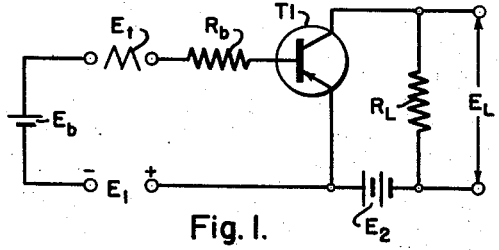

June 23, 1959

R. O. DECKER ET AL 2,891,726

MULTIPLIER CIRCUIT

Filed May 7, 1956

2 Sheets-Sheet 1

$E_O = E_{L1} - E_{L2}$
$E_I = 0$ $E_O = E_{L1} - E_{L2}$
$E_I > 0$ $E_O = E_{L1} - E_{L2}$
$E_I < 0$

WITNESSES:
Bernard R. Gieguay
Wm. B. Sellers

INVENTORS
Richard O. Decker and
Kan Chen.
BY E. F. Oberheim
AGENT

United States Patent Office 2,891,726
Patented June 23, 1959

2,891,726

MULTIPLIER CIRCUIT

Richard O. Decker, Murrysville, and Kan Chen, Wilkinsburg, Pa., assignors to Westinghouse Electric Corporation, East Pittsburgh, Pa., a corporation of Pennsylvania Application May 7, 1956, Serial No. 583,049

9 Claims. (Cl. 235—184)

This invention relates generally to computer circuits and more particularly to a circuit capable of producing an electrical quantity proportional to the product of a pair of electrical quantities applied thereto.

The use of analog computers for general purpose analysis and for many types of applications wherein computer functions are required usually requires a device for multiplying electrical quantities. Numerous devices have been proposed for the multiplication of electrical quantities but these have usually been unsatisfactory from the standpoint of simplicity, durability and accuracy. The respective importance of these points will, of course, vary with the application but in general a need exists for a suitable multiplying circuit, such as provided by the present invention, which is inherently simple, which is accurate within approximately one percent or less of its full scale output and which is sufficiently durable to operate at loads within its capacity for long periods of time without failure.

Reproducibility is also a distinctive feature of this circuit. So long as the transistors meet the switching requirements, the computer can be manufactured on a mass-production basis and needs no periodical adjustment as many other multipliers do.

The present invention provides a simple multiplication circuit for analog computers which utilizes the principles of pulse-width modulation as part of the multiplying process. In view of this, a simple switching device may be employed which is operated between conducting and non-conducting states or conditions, the conducting period being controlled by one of the quantities to be multiplied and the magnitude of the output being controlled by the other of the two quantities to be multiplied. This basic concept may be expanded into either two quadrant or four quadrant applications so that voltages of any relative magnitude within the capacities of the device and of any instantaneous polarity relation may be handled to achieve instantaneous products thereof.

Accordingly, one object of this invention is to provide an analog multiplying circuit which is simple with respect to operational requirements.

Another object of this invention is to provide a multiplying circuit of the character referred to which is accurate, say in the order of less than one percent of full scale or full output.

A further object of this invention is to provide an analog multiplying circuit which is capable of four quadrant operation, that is, having an output of correct polarity for the particular polarity or instant polarities of the inputs, both of which may be reversible with respect to the other.

Yet another object of this invention is to provide an analog type of multiplying circuit which is stable in operation in the presence of temperature variations.

It is also an object of this invention to provide an analog type of multiplying circuit applicable in the multiplication of both alternating and direct-current voltages.

Figure 2:
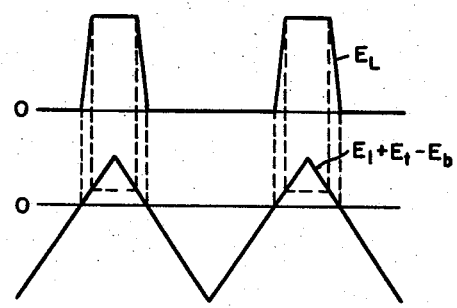
Figure 3:
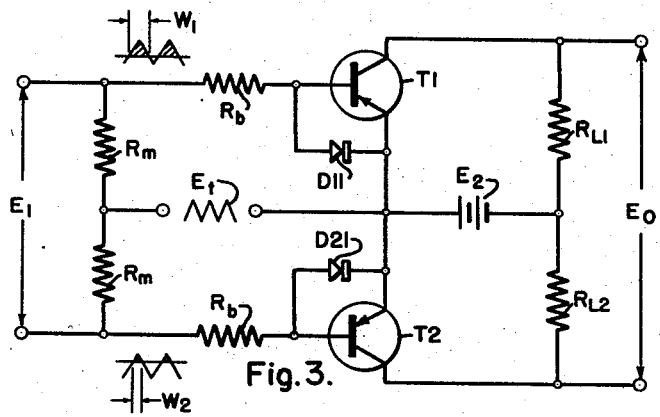
Figure 4:
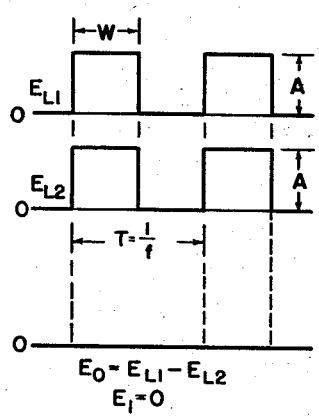
Figure 5:
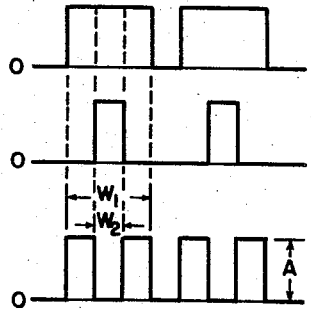
Figure 6:
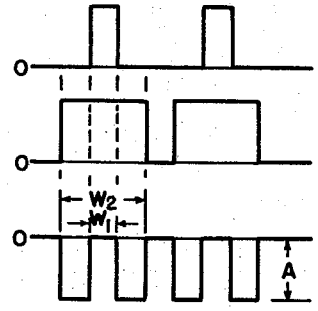
Figure 7:
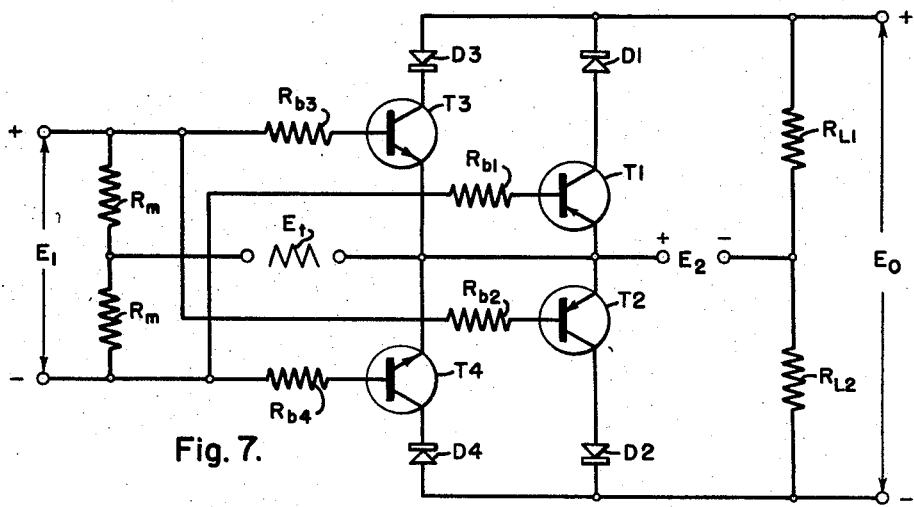
Figure 8:
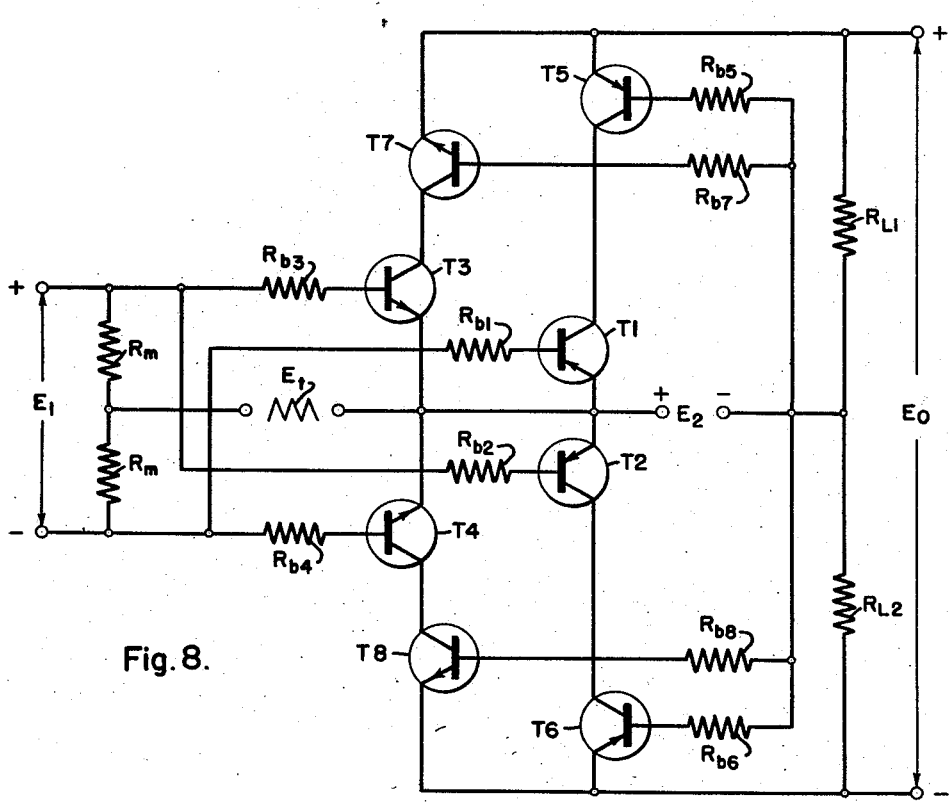

The foregoing statements are merely illustrative of the various aims and objects of this invention. Other objects and advantages will become apparent upon the study of the following specification when considered in conjunction with the accompanying drawings, in which Figure 1 is a diagrammatic illustration of a simple pulse-width modulator arranged for single-ended operation;

Fig. 2 graphically illustrates one mode of operation of the circuit of Fig. 1;

Fig. 3 is a circuit embodying the pulse-width modulation principles of Fig. 1 in a push-pull circuit configuration affording two quadrant operation;

Figs. 4, 5 and 6 graphically depict circuit operating characteristics of Fig. 3;

Fig. 7 is a circuit extending the range of operation of the circuit of Fig. 3 into four quadrant multiplication, and Fig. 8 is a modification of the circuit of Fig. 7.

The invention, as herein illustrated among the several embodiments in the drawings, utilizes switching transistors in pulse-width modulation circuits. It will be appreciated by those skilled in the art that the invention is not necessarily limited to such devices but may be practiced with other types of devices, for example, thyratrons and certain types of high vacuum tubes. In fact, the invention may be practiced with any type of device capable of switching between conducting and non-conducting states, or closed circuit or open circuit positions, by a suitable control stimulus.

In the arrangement illustrated in Fig. 1, a p-n-p type of switching transistor generally designated T1 is connected to be controlled as a pulse-width modulator. In this circuit the collector and emitter terminals of the transistor, representing the output terminals, are connected in a closed loop with a battery, generally designated $E_2$, and a load resistor generally designated $R_L$. The base terminal of this transistor is connected in a closed loop with the emitter terminal, which loop includes in series a base voltage bias resistor $R_b$, an alternating-current supply voltage of triangular wave-form designated $E_t$, a bias battery $E_b$ and a voltage supply $E_1$. In the circuit illustrated, the voltages $E_1$ and $E_2$ are to be multiplied. The triangular wave-form voltage $E_t$ biases the transistor T1 between conducting and non-conducting states about its zero level with each half-cycle thereof. The bias battery $E_b$ establishes the zero level of the triangular voltage wave $E_t$ and therefore provides a reference level for controlling the relationship of the conducting to the non-conducting period of the transistor T1.

To simplify the considerations herein involved, the simplest conditions are assumed wherein the voltages $E_1$ and $E_2$ are respectively direct-current voltages and the magnitude of $E_2$ remains constant with each square wave conducting cycle of the transistor. The voltage $E_1$ is assumed to be of the polarity indicated by the plus and minus signs adjacent the respective voltage terminals. The algebraic addition of this voltage in the base terminal control loop with the bias voltage $E_b$ and the triangular voltage wave component $E_t$ results in a shift in the zero level of the triangular voltage wave $E_t$. The characteristic of the control will be seen by reference to Fig. 2 wherein shifting of the zero level vertically of the triangular wave results in a change in the period of conduction of the transistor. Thus, when the zero level of the triangular wave occupies a position approaching the upper extremities of the wave, the base of the triangular wave at the zero level becomes relatively small and consequently the conducting interval of the transistor is correspondingly short. On the other hand, as the zero level of the triangular wave is shifted towards the bottom of the triangular wave, the conducting period correspondingly increases. The choice of the triangular wave makes the relationship between the magnitude of $E_1$ and the corresponding conducting periods of the transistor T1 linear which is essential in the multiplication process. Thus, the width of the square wave which results from switching operation of the transistor T1 by changing the zero level of the triangular wave which controls transistor conduction, is linearly related to the first of the two voltages $E_1$ which are to be multiplied.

The voltage $E_2$ being connected directly across the collector and emitter terminals of the transistor, which in this case function as the output terminals, directly controls the output of the transistor. Since the transistor is switched between conditions in which the transistor impedance is essentially zero for full conduction and a second condition in which the transistor impedance is very high, resulting in very low leakage current, and, since the impedances in these respective extremes are approximately constant and, further, since the magnitude of the resistance $R_L$ is constant, it will be appreciated that the voltage drop across the resistor $R_L$ is linearly related to the magnitude of the voltage $E_2$.

The output characteristic of the transistor circuit is illustrated in exaggerated form in the upper portion of Fig. 2. This voltage, it will be appreciated, is not exactly a square wave voltage, but is somewhat trapezoidal in configuration. This results from the fact that some time delay exists in switching the transistor between non-conducting and conducting states. This inaccuracy, however, has been found to be very slight and for most practical purposes the result may be considered to be a square wave.

Thus, since the width of this wave is controlled by the first of the two quantities to be multiplied and since the amplitude of this square wave is controlled by the second of the two quantities to be multiplied, it will be appreciated that the output voltage pulses each represent the product of the two voltages or quantities which are to be multiplied.

The single ended circuit in Fig. 1 is capable of multiplying only voltages having a fixed polarity relationship. In order that at least one of the voltages may be varied in polarity with respect to the other, a circuit arrangement such as that illustrated in Fig. 3 may be utilized wherein a push-pull pulse-width modulating circuit arrangement is shown. In the interest of simplicity in Fig. 3, parts corresponding to those illustrated in Fig. 1 bear like reference characters. Fig. 3 employs the p-n-p type of switching transistor discussed in connection with Fig. 1, two such transistors T1 and T2 being employed. The output terminals, namely the collector and emitter terminals are connected in parallel circuits with respect to the battery $E_2$ which represents one of the quantities which are to be multiplied. The respective parallel circuits include respective load resistors $R_{L1}$ and $R_{L2}$ which constitute the electrical load for the respective transistors. The transistors are so connected that their outputs appear across the combined load resistance circuits including $R_{L1}$ and $R_{L2}$ in series, in electrical opposition. The base terminals of the transistors are connected in parallel with the triangular wave voltage $E_t$, the voltage being applied to each between the respective emitters and base terminals in respective circuits including resistors $R_m$ and $R_b$. Thus, the triangular wave voltage simultaneously controls both of the base terminals in the same sense to simultaneously switch the transistors between conducting and non-conducting states.

As in the circuit of Fig. 1, pulse-width modulation is again employed to achieve multiplication. In this instance the voltage $E_1$ is applied across the series connected resistors $R_m$ and consequently adds and subtracts to the respective triangular wave voltages in the base terminal circuits of the transistors. The characteristic is such as to provide a longer conducting interval during each half cycle of the triangular wave voltage for the transistor T1 than is obtained with respect to the transistor T2, as indicated by the base widths $W_1$ and $W_2$ of the shaded triangular wave voltages adjacent the respective base terminal circuits. For the indicated conditions, the transistor T1 conducts longer than the transistor T2. The magnitude of conduction, A (see Fig. 4), of the respective transistors depends upon the value of $E_2$. Assuming corresponding impedances in the conducting states of the transistors and corresponding values of the resistors $R_{L1}$ and $R_{L2}$, square wave, or rectangular wave voltage pulses are produced across the respective load resistors, which are equal in magnitude but which differ in width.

The basic two quadrant multiplier described above operates satisfactorily as described. But certain improvements may be realized by the connection of diodes D11 and D21 between the base and emitter electrodes of the respective transistors. In each case, the diode anode is connected to the base terminal and the cathode to the emitter terminal.

The use of diodes D11 and D21 has the following advantages.

(1) Before the diodes are added, the respective ohmic values of resistors $R_m$ must be much smaller than the ohmic values of resistors $R_b$, say, of the order of one-tenth or less, in order that the input $E_1$ is divided equally by the resistors $R_m$. This is due to the loading of the resistors $R_b$. For instance, if T1 conducts and T2 blocks, the upper resistor $R_m$ is shunted by the upper resistor $R_b$ and the lower resistor $R_m$ is not shunted by the lower resistor $R_b$. After the diodes D11 and D21 are added, the two resistors $R_m$ are always shunted by the respective resistors $R_b$ regardless of whether or not the transistors T1 and T2 are conducting or blocking. In other words, a balanced bridge circuit is formed, and the voltage $E_1$ is divided equally by the resistors $R_m$ even when the $R_m$ resistors are respectively comparable in ohmic value to, or larger than, the respective ohmic values of resistors $R_b$. This means that the input impedance of the multiplying circuit (with respect to $E_1$) can be increased by at least one order of magnitude.

(2) When the transistors are non-conducting or blocking, an inverse voltage equal to the peak of the triangular voltage $E_t$ exists between the base and emitter, if the diodes are not used. The peak inverse base-collector voltage is equal to the sum of the peak $E_t$ voltage and $E_2$. Addition of the diodes reduces the inverse emitter-base voltage to the forward drop of the diodes and reduces the inverse collector-base voltage to $E_2$ plus the small forward drop of the diodes. This means a great relaxation of voltage specification for the transistors viewed from another angle, with a given allowable inverse base-collector voltage for the transistor, the addition of the diodes D11 and D21 permit the range of the voltage $E_2$ to be extended, apparently by a factor of 2, or the accuracy may be improved by a factor of 2.

The diode connections shown apply to the p-n-p type of junction transistor. For the n-p-n type of transistor the diode connection is reversed, that is, the diode anode is connected to the emitter terminal and the diode cathode is connected to the base terminal. From the teachings hereinbefore, the application of the diodes in the four quadrant multiplier circuits which follow will be appreciated, although the diode connections are not shown in the interest of simplicity.

Fig. 4 indicates a condition in which both transistors are conducting during equal periods of time. This is the case when voltage $E_1$ is zero. The voltages $E_{L1}$ and $E_{L2}$ across $R_{L1}$ and $R_{L2}$, respectively, now have the same width and are electrically opposed. Consequently, the voltage $E_0$ equals zero.

In Fig. 5 the condition described above, wherein the transistor T1 conducts longer than transistor T2 is indicated. For this condition, the voltage $E_1$ is assumed greater than zero. The upper rectangular wave voltage in Fig. 5, represents the output voltage which appears across resistor $R_{L1}$. This is the voltage $E_{L1}$. The central rectangular wave voltage is the voltage $E_{L2}$ which appears across the resistor $R_{L2}$. Since these voltages are electrically opposed, the resultant output appears as a series of rectangular wave pulses, each of which is the difference of the voltages $E_{L1}$ and $E_{L2}$. Since these voltages are equal in magnitude the net voltage varies in dependence of the relative widths $W_1$ and $W_2$ of the voltages $E_{L1}$ and $E_{L2}$ representing the product of the voltages $E_1$ and $E_2$.

Fig. 6 depicts the condition in which the voltage $E_1$ is less than zero, that is, is of opposite polarity with respect to the polarity of $E_1$ assumed in Fig. 5. The conducting characteristics of the transistors T1 and T2 are now reversed and the duration of the voltage $E_{L2}$ exceeds that of voltage $E_{L1}$. As a consequence, the output voltage $E_0$ is reversed in polarity and is of an average value depending upon the width of the resultant rectangular pulses. From this it will be appreciated that two quadrant operation is provided by means of the circuit of Fig. 3.

The arrangement illustrated in Fig. 7 provides four quadrant operation wherein the voltages $E_1$ and $E_2$ may be each reversed in polarity and may be instantaneously of the same polarity or of reversed polarity covering the four possible variations in relative polarity of the voltages. This circuit embodies the fundamental principles of the circuit of Fig. 1 and utilizes the basic push-pull circuit configuration illustrated in Fig. 3, but extends the range to the two remaining quadrants by the addition of a second push-pull transistor circuit, which is electrically inverted with respect to the other. To provide polarity discrimination in the circuits so that unwanted conduction through any transistor can not occur, the respective transistor circuits are polarized by means of suitable rectifiers. These may be contact type rectifiers as illustrated, or diodes, or other suitable types of rectifying or switching devices. Again, in the interest of simplicity, the parts in Fig. 7 corresponding to those in Fig. 3 bear like reference characters.

This circuit again comprises a pair of p-n-p switching transistors having their output circuits connected in parallel with one of the two voltages $E_2$ to be multiplied. Diodes D1 and D2 are connected in series in the transistor output circuits polarizing the respective circuits. Transistors T3 and T4 which are the n-p-n type of switching transistors are also respectively connected with their output circuits arranged in parallel with the voltage $E_2$. Diodes D3 and D4 which are poled in opposite senses with respect to diodes D1 and D2, respectively, are connected in series in the output circuits of the transistors T3 and T4. Triangular wave-form voltage $E_t$ is applied in parallel to the base terminals of transistors T1 and T2 through the voltage divider resistors $R_m$ and respective base biasing resistors $R_{b1}$ and $R_{b2}$, and this triangular wave voltage is similarly applied in parallel to the respective base terminals of transistors T3 and T4 through resistors $R_m$ and the base biasing resistors $R_{b3}$ and $R_{b4}$, respectively, so that all of the transistors are correspondingly and simultaneously biased between their conducting and non-conducting states. As in the case of the two quadrant multiplier of Fig. 3, the remaining voltage $E_1$ to be multiplied is applied across the base terminals of all of the transistors. In this connection it should be noted that the base voltage of the transistor T2 corresponds to the base voltage bias of the transistor T3 and that the base voltage of the transistor T1 corresponds to the base voltage of the transistor T4 at any instant by reason of the cross-connection of the base connections as illustrated.

Thus, assuming the instantaneous polarities of the voltages $E_1$ and $E_2$, as indicated in Fig. 7, and recalling the opposite conducting characteristics of the transistor T2 with respect to T3 and the transistor T1 with respect to transistor T4, it will be appreciated that transistors T1 and T2 will conduct and that transistor T1 will conduct longer than the transistor T2. Thus the average IR drop across the upper resistor $R_{L1}$ is greater and the net output has the polarity indicated with the upper terminal being positive and the lower terminal being negative.

If now the polarity of $E_2$ is reversed, the output of transistors T1 and T2 is virtually zero and the polarity of $E_2$ is such as to be passed by the diodes D3 and D4. For this condition the transistor T3 will conduct longer than the transistor T4. The IR drop across the upper load resistor $R_{L1}$ is still greater but the polarity has been reversed. Consequently, the polarity of the voltages $E_0$ will also be reversed for this condition.

With the polarity of the voltage $E_2$ as marked in the drawing reversal of the polarity of the voltage $E_1$ causes the transistor T2 to conduct longer than the transistor T1. The IR drop across the load resistor $R_{L2}$ is now greater than that across the resistor $R_{L1}$ and therefore the polarity of the output voltage $E_0$ is reversed. Following the same reasoning, it may be seen that the output polarity will remain unchanged when the polarities of both of the inputs are reversed from that indicated in the drawings.

In the event that the diodes are believed undesirable because of their high forward drops and high leakage currents at elevated temperatures, they may be replaced by switching transistors operated in the inverted connection as illustrated in Fig. 8. In Fig. 8 the transistors which replace the diodes are rectifiers designated T5, T6, T7 and T8 which are inverted with respect to the transistors in series therewith. The base terminals of these respective transistor switches are controlled by the polarity of the voltage $E_2$ applied in the transistor output circuit, the base biasing resistors $R_{b5}$, $R_{b6}$, $R_{a7}$, $R_{b8}$, respectively, connecting a common terminal of the voltage supply $E_2$ to all of these transistor base terminals so that the transistors are correspondingly biased for any particular polarity of the voltage $E_2$. Thus referring to the polarity markings for the respective voltages $E_1$ and $E_2$, which are to be multiplied, it will be seen that the transistor T1 is set to conduct as a result of the base bias voltage and also to conduct the particular indicated polarity of the voltage $E_2$. Similar conditions apply to the transistor T2. The transistor T1 by reason of its bias will conduct longer than the transistor T2. Switching transistor T5, which is disposed in inverted relation in series with T1, is now biased to conduct and operates as a switch to pass current from transistor T1 therethrough. Similar considerations are applied to transistor T6. Thus the outputs of transistors T1 and T2 are switched to respective load resistors $R_{L1}$ and $R_{L2}$ to result in a polarity of output voltage $E_0$ in which the upper terminal is positive and the lower terminal is negative. During this interval, the negative bias on the base of the inverted transistors T7 and T8 biases the respective transistors to their non-conducting states, preventing flows of current therethrough. If the polarity of the voltage $E_1$ is now reversed, it will be appreciated that the transistor T1 will conduct longer than the transistor T2 to result in the condition as described in connection with Fig. 7. Reversal of the voltage $E_2$ results in biasing of the transistors T5 and T6 to their non-conducting states and biasing of the transistors T7 and T8 to conducting conditions. This again is a switching action as described hereinabove. Thus, the transistors T3 and T4 are now controlled in relative lengths of their conducting periods by the polarity of the input voltage $E_1$.

Although the various embodiments of this invention have been described in connection with voltages such as $E_1$ and $E_2$ having constant magnitude, it will be appreciated that these voltages may be of variable magnitude. Normally the width of the rectangular output pulses are sufficiently small that no appreciable error will be introduced by variations in the magnitude of either of the multiplying voltages $E_1$ and $E_2$ during any particular conducting period. Thus, it will be appreciated that alternating-current voltages or transient voltages may be multiplied provided the respective frequencies of these voltages do not exceed approximately one-half of the frequency of the alternating triangular wave voltage, in keeping with standard consideration regarding modulation in electronic circuits.

The foregoing disclosure and showings made in the drawings are merely illustrative of the principles of this invention. It will be appreciated by those skilled in the art, as noted hereinabove, that this invention may be subject to modifications in its details through substitution of other types of electronic or electric devices for the switching transistors indicated, and that this invention may be further modified in the organization of its details, all without departure from the spirit and scope of this invention. Accordingly, it is intended that the foregoing disclosure shall be considered only as illustrative of the principles of this invention and not construed in a limiting sense.

We claim as our invention:

1. A multiplying circuit for multiplying a pair of electrical quantities, a pair of switching transistors connected in push-pull circuit, each transistor having collector, emitter and base terminals, circuit means having circuit connections with said transistors including said base terminals for simultaneously applying an alternating voltage of triangular wave form to both of said base terminals to simultaneously drive said transistors between conducting and non-conducting states, circuit connections with both of said base terminals for applying one of said pair of electrical quantities to said base terminals to control said base terminals in opposite senses, increasing the conducting period of one transistor while decreasing the conducting period of the other; said one of said pair of electrical quantities being of less magnitude than said alternating voltage of triangular wave form, load circuit means connecting the collector and emitter terminals of both transistors in electrical opposition, and circuit connections with said load circuit means for applying the second of said pair of electrical quantities in the same sense to both of said transistors, the product of said electrical quantities appearing as the differential of the electrical outputs of said transistors in said load circuit means.

2. A multiplying circuit for multiplying a pair of electrical quantities comprising, a pair of switching transistors having input and output terminals, circuit connections with said input terminals for applying an alternating voltage of triangular wave form to the input terminals of both transistors for simultaneously controlling both transistors in the same sense, circuit connections with the input terminals of both transistors for applying one of said pair of voltages to said input terminals to simultaneously control said transistors in opposite senses, said alternating voltage being of greater magnitude than said one of said pair of voltages, load circuit means connecting said output terminals in opposition, and circuit connections with said load circuit means applying the remaining of said pair of electrical quantities in the same sense to the output terminals of both of said transistors, the product of said electrical quantities appearing in said load circuit as the difference of the electrical outputs of said transistors.

3. A multiplying circuit for multiplying a pair of electrical quantities comprising, a pair of pulse-width modulation circuits connected for push-pull operation, having respective input circuit means for receiving an alternating voltage of triangular wave form to be controlled in the same sense, and having respective interconnected output circuit means producing opposed square wave voltages from one of said pair of electrical quantities and said triangular wave form voltage as long as said one electrical quantity is of less magnitude than peak values of said triangular wave form voltage, circuit means applying said one of said pair of electrical quantities to simultaneously oppositely control said respective input circuit means, and circuit means applying the remaining of said pair of electrical quantities in the same sense to said respective output circuit means.

4. A four quadrant analog multiplier circuit for multiplying a pair of voltages comprising, a first pair of polarized parallel connected, similarly poled switching devices having respective electrical loads, respective electrical control means for switching said devices between conducting and non-conducting states, a second pair of polarized, parallel connected similarly poled switching devices respectively connected with said respective electrical loads and having respective control means for switching said devices between conducting and non-conducting states, each of said second pair of polarized switching devices being poled in a sense opposite to the corresponding switching device of said first pair, circuit means common to said switching devices and said electrical loads for applying one of said pair of voltages to said switching devices, circuit means common to all said control means for simultaneously applying an alternating current switching voltage of triangular wave form and greater magnitude than said one of said pair of voltages thereto, first circuit means applying the second of said pair of voltages to the control means of one of said pair of switching devices to control said one pair of switching devices in opposite senses, and second circuit means applying said second of said pair of voltages to the control means of said second pair of switching devices to control said second pair of switching devices in opposite senses in a sense opposite to the control of said first pair of switching devices, the product of said pair of voltages appearing as the difference of the voltages across said respective electrical loads.

5. A four quadrant multiplier for multiplying a pair of voltages comprising, a first pair of switching transistors having parallel connected output circuits and having switching control means, an electrical load connected in series in each parallel circuit, a second pair of switching transistors having parallel connected output circuits including said respective electrical loads in series therein and having switching control means, circuit connections to all of said output circuits for applying the first of said pair of voltages to said output circuits, circuit connections for applying a triangular wave voltage to all said switching control means to control said switching control means in the same sense, and circuit means applying the other of said pair of voltages to the control means of said first pair of switching transistors to effect push-pull switching control thereof and to the control means of said second pair of switching transistors to effect push-pull operation thereof in a sense opposite to said first switching transistors, said other of said pair of voltages being of less magnitude than said triangular wave voltage, the differential of the voltages appearing across said electrical loads being indicative of the product of said pair of voltages.

6. A multiplier circuit for multiplying a pair of voltages comprising, a switching transistor having collector, emitter and base terminals; circuit connections with said base terminal for applying an alternating switching voltage of triangular wave form to said base terminal, circuit connections with said base terminal for applying one of said pair of voltages to said base terminal to shift the zero level of said triangular voltage to vary the conducting period of said transistor, said one of said pair of voltages being of less magnitude than said alternating switching voltage, a load circuit connected with said collector and emitter terminals, circuit connections with said load circuit for applying the second of said pair of voltages to said load circuit, and rectifier means connected between the base and emitter terminals of said transistor and poled to reduce inverse voltages between said base and emitter terminals of said transistor.

7. A multiplying circuit for multiplying a pair of electrical quantities, a pair of switching transistors connected in push-pull circuit, each transistor having collector, emitter and base terminals, circuit means having common circuit connections with corresponding pairs of terminals of said transistors and including said base terminals for simultaneously applying an alternating voltage of triangular wave form to both of said base terminals to simultaneously drive said transistors between conducting and non-conducting states, circuit connections with both of said base terminals for applying one of said pair of electrical quantities to said base terminals to control said base terminals in opposite senses, increasing the conducting period of one transistor while decreasing the conducting period of the other; said alternating voltage of triangular wave form being of greater magnitude than said one of said pair of voltages, load circuit means connecting the collector and emitter terminals of both transistors in electrical opposition, circuit connections with said load circuit means for applying the second of said pair of electrical quantities in the same sense to both of said transistors, the product of said electrical quantities appearing as the differential of the electrical outputs of said transistors in said load circuit means, and respective rectifiers connected between the base and emitter terminals of said respective transistors and poled to reduce inverse voltages between the respective base and emitter terminals of said transistors.

8. A four quadrant analog multiplier circuit for multiplying a pair of voltages comprising, a first pair of polarized parallel connected, similarly poled switching devices having respective electrical loads, respective electrical control means for switching said devices between conducting and non-conducting states, a second pair of polarized, parallel connected similarly poled switching devices respectively connected with said respective electrical loads and having respective control means for switching said devices between conducting and non-conducting states, each of said second pair of polarized switching devices being poled in a sense opposite to the corresponding switching device of said first pair, circuit means common to said switching devices and said electrical loads for applying one of said pair of voltages to said switching devices, circuit means common to all said control means for simultaneously applying an alternating current switching voltage of triangular wave form and greater magnitude than said one of said pair of voltages thereto, first circuit means applying the second of said pair of voltages to the control means of one of said pair of switching devices to control said one pair of switching devices in opposite senses, and second circuit means applying said second of said pair of voltages to the control means of said second pair of switching devices to control said second pair of switching devices in opposite senses in a sense opposite to the control of said first pair of switching devices, the product of said pair of voltages appearing as the difference of the voltages across said respective electrical loads, said polarized switching devices each including a polarizing rectifier.

9. A four quadrant analog multiplier circuit for multiplying a pair of voltages comprising, a first pair of polarized parallel connected, similarly poled switching devices having respective electrical loads, respective electrical control means for switching said devices between conducting and non-conducting states, a second pair of polarized, parallel connected similarly poled switching devices respectively connected with said respective electrical loads and having respective control means for switching said devices between conducting and non-conducting states, each of said second pair of polarized switching devices being poled in a sense opposite to the corresponding switching device of said first pair, circuit means common to said switching devices and said electrical loads for applying one of said pair of voltages to said switching devices, circuit means common to all said control means for simultaneously applying an alternating current switching voltage of triangular wave form and greater magnitude than said one of said pair of voltages thereto, first circuit means applying the second of said pair of voltages to the control means of one of said pair of switching devices to control said one pair of switching devices in opposite senses, and second circuit means applying said second of said pair of voltages to the control means of said second pair of switching devices to control said second pair of switching devices in opposite senses in a sense opposite to the control of said first pair of switching devices, the product of said pair of voltages appearing as the difference of the voltages across said respective electrical loads, each of said polarized switching devices including a switching transistor switched between conducting and non-conducting states in dependence of said first of said pair of voltages.

References Cited in the file of this patent

A High-Accuracy Time-Division Multiplier (Goldberg), RCA Review, September 1952, vol. XIII, No. 3, pages 265–274.

Introduction to Electronic Analogue Computers (Wass), published by McGraw-Hill Book Co., New York, 1955, pages 111–119.

Four-Quadrant Multiplication With Transistors and Magnetic Cores (Allen), Transactions of the AIEE, November 1955, pages 643–648.